US007706290B2

(12) United States Patent
Soncodi (10) Patent No.: US 7,706,290 B2
(45) Date of Patent: Apr. 27, 2010

(54) OBJECT-BASED OPERATION AND MAINTENANCE (OAM) SYSTEMS AND RELATED METHODS AND COMPUTER PROGRAM PRODUCTS

(75) Inventor: Adrian Cornel Soncodi, Plano, TX (US)

(73) Assignee: Genband Inc., Plano, TX (US)

( * ) Notice: Subject to any disclaimer, the term of this patent is extended or adjusted under 35 U.S.C. 154(b) by 924 days.

(21) Appl. No.: 11/226,849

(22) Filed: Sep. 14, 2005

(65) Prior Publication Data

US 2006/0056301 A1     Mar. 16, 2006

Related U.S. Application Data

(60) Provisional application No. 60/609,637, filed on Sep. 14, 2004.

(51) Int. Cl.
*H04J 3/14*     (2006.01)
(52) U.S. Cl. .................................. 370/241.1; 370/236.2
(58) Field of Classification Search ................. 370/241, 370/389, 391, 392, 241.1, 236.2, 242, 252, 370/254, 255, 256, 216, 310, 349, 399, 390, 370/395, 395.3, 396, 397, 398, 400, 401, 370/409, 410, 418, 474, 526; 714/25, 39, 714/43, 44, 47, 48, 56, 819, 825; 709/203, 709/206, 249, 221, 223; 379/229, 325; 702/188; 710/15, 17; 717/106, 143
See application file for complete search history.

(56) References Cited

U.S. PATENT DOCUMENTS 5,414,812 A    5/1995   Filip et al.

| 5,751,962 A | 5/1998 | Fanshier et al. |
| 5,787,413 A | 7/1998 | Kauffman et al. |
| 5,818,842 A | 10/1998 | Burwell et al. |

(Continued)

FOREIGN PATENT DOCUMENTS

WO       WO 97/22213       6/1997

OTHER PUBLICATIONS

Paul McDonlad, Signaling with objects, Apr. 1998, BT Technology, vol. 16, No. 2, pp. 169-177.*

(Continued)

*Primary Examiner*—Aung S Moe
*Assistant Examiner*—Abdullah Riyami
(74) *Attorney, Agent, or Firm*—Jenkins, Wilson, Taylor & Hunt, P.A.

(57) ABSTRACT

Object-based operation and maintenance (OAM) systems and related methods and computer program products are disclosed. One exemplary system includes a computer comprising a memory. The computer is in communication with a network comprising a network-attached components operating in an OAM system. The system can also include an object-based representation of the network stored in the memory. The object-based representation comprises objects linked together in the memory to form a hierarchy. Each of the objects represent the network or the network-attached components. In addition, each of the objects stores attribute information about the network or the network-attached components with regard to the OAM system. Further, the system can include an application for interpreting and utilizing the object-based representation of the network for operating and maintaining the network and network-attached components in the OAM system.

41 Claims, 4 Drawing Sheets

U.S. PATENT DOCUMENTS

| | | | |
|---|---|---|---|
| 5,933,601 | A | 8/1999 | Fanshier et al. |
| 6,018,567 | A | 1/2000 | Dulman |
| 6,026,091 | A | 2/2000 | Christie et al. |
| 6,233,610 | B1* | 5/2001 | Hayball et al. ............... 709/223 |
| 6,449,284 | B1* | 9/2002 | Hagirahim .................. 370/466 |
| 6,516,000 | B1* | 2/2003 | Kshirsagar et al. .......... 370/410 |
| 6,549,530 | B1* | 4/2003 | Cable et al. ................. 370/347 |
| 6,564,341 | B1* | 5/2003 | Sundaram et al. ............. 714/43 |
| 6,629,112 | B1 | 9/2003 | Shank et al. |
| 6,650,646 | B1 | 11/2003 | Galway et al. |
| 6,694,375 | B1* | 2/2004 | Beddus et al. ............... 709/249 |
| 6,894,980 | B1* | 5/2005 | Pugaczewski et al. ....... 370/242 |
| 6,898,278 | B1* | 5/2005 | Li et al. ...................... 379/325 |
| 6,917,586 | B1 | 7/2005 | Mauger et al. |
| 2001/0002909 | A1 | 6/2001 | Iwamoto |
| 2001/0043561 | A1 | 11/2001 | Burns et al. |
| 2002/0019862 | A1* | 2/2002 | Borrett et al. ............... 709/221 |
| 2002/0024954 | A1 | 2/2002 | Cunetto et al. |
| 2002/0146011 | A1 | 10/2002 | Stern |
| 2002/0156756 | A1* | 10/2002 | Stanley et al. ................. 706/47 |
| 2002/0172348 | A1* | 11/2002 | Cheung et al. ............. 379/242 |
| 2003/0004687 | A1* | 1/2003 | Seki ........................... 702/188 |
| 2003/0086444 | A1* | 5/2003 | Randmaa et al. ............ 370/526 |
| 2004/0054714 | A1* | 3/2004 | Wuerfel et al. .............. 709/203 |
| 2004/0100954 | A1* | 5/2004 | Dai et al. .................... 370/389 |
| 2004/0131064 | A1* | 7/2004 | Burwell et al. .............. 370/397 |
| 2006/0031312 | A1* | 2/2006 | Ellanti et al. ................ 709/206 |
| 2007/0185966 | A1* | 8/2007 | Chevanne et al. ........... 709/208 |
| 2008/0025295 | A1* | 1/2008 | Elliott et al. ................ 370/356 |

OTHER PUBLICATIONS

"CORBA® Basics," http://www.omg.org/gettingstarted/corbafaq.htm, Object Management Group, Inc., pp. 1-5 (Copyright 1997-2004).

Notification Concerning Transmittal of International Search Report in International Application No. PCT/US2005/32599 (Sep. 14, 2005).

"Management Information Base," http://en.wikipedia.org/wiki/Management_Information_Base, Wikipedia (Downloaded Nov. 26, 2008).

McCloghrie et al., "Management Information Base for Network Management of TCP/IP-based Internets," Network Working Group, RFC 1156, pp. 1-85 (May 1990).

Rose et al., "Structure and Identification of Management Information for TCP/IP-based Internets," Network Working Group, RFC 1155, pp. 1-21 (May 1990).

Extended European Search Report for European Patent No. 1794605 (Apr. 15, 2009).

* cited by examiner

OBJECT-BASED OPERATION AND MAINTENANCE (OAM) SYSTEMS AND RELATED METHODS AND COMPUTER PROGRAM PRODUCTS

RELATED APPLICATIONS

This application claims the benefit of U.S. Provisional Application No. 60/609,637 entitled "Object-Based Operation and Maintenance (OAM) Systems and Related Methods", filed Sep. 14, 2004, the disclosure of which is incorporated herein by reference in its entirety.

TECHNICAL FIELD

The subject matter described herein relates to network management systems. More particularly, the subject matter described herein relates to object-based operation and maintenance (OAM) systems and related methods and computer program products.

BACKGROUND ART

Managing and monitoring connected components is important for local and wide area network applications and other interconnected environments. Several operation and maintenance (OAM) systems and related protocols are known which are designed to enable network management of network-attached components. Some of these systems and protocols include a collection of attributes and procedures for accessing the attributes associated with a network-attached component.

One example of an OAM protocol is simple network management protocol (SNMP). Under SNMP, a network device has an attribute management system which includes a database for storing attribute information relating to the network device, referred to as a management information base (MIB). The network device can also contain agent software for querying and modifying the attribute information, referred to as an agent. A network being managed under SNMP also includes a management station running management software which provides centralized control of the various network components by communicating with the agent software over the network. The management software typically runs on a network-attached computer and an interface is provided in the form of a graphical user interface (GUI). The management software obtains information about various network-attached components in the MIBs and allows a user to monitor, query or modify the information in the MIBs. To monitor, query or modify information, the management software sends a request over the network to the attribute management system. Agent software for examining or otherwise performing operations on the attribute examines the request, and if valid, carries out the request and sends a message back to the management software.

Typical networks include network-attached components in distributed architectures that are manufactured by a variety of different vendors. These different network-attached components typically require customization in order to integrate these components with current OAM systems and protocols, such as SNMP. Due to the difficulty with integrating different vendor-specific aspects, current OAM systems and related protocols have been limited to managing only the attributes of network-attached components that are common to all or a large portion of vendors. Therefore, there exists a need for improved OAM systems and protocols for integrating the vendor-specific aspects of different network-attached components.

Other OAM systems, such as CORBA® (acronym for Common Object Request Broker Architecture) (developed by Object Management Group, Inc. of Needham, Me., U.S.A.), can be overly complex except for advanced programmers. The complexity of such systems can result in an OAM operator having difficulty interpreting displayed information. In addition, existing OAM systems can require excessive implementation overhead. Therefore, there exists a need to provide OAM systems and protocols having reduced complexity for improving operator interface.

Accordingly, there exists a need for improved systems, methods, and computer program products for operating OAM-based networks.

SUMMARY

According to one aspect, systems are provided for operating and maintaining resources in a distributed network. According to one example, a system includes a computer comprising a memory. The computer is in communication with a network comprising a plurality of network-attached components operating in an operation and maintenance (OAM) system. The system can also include an object-based representation of the network stored in the memory. The object-based representation comprises objects linked together in the memory to form a hierarchy. Each of the objects represents the network or the network-attached components. In addition, each of the objects stores attribute information about the network or the network-attached components with regard to the OAM system. Further, the system can include an application for interpreting and utilizing the object-based representation of the network for operating and maintaining the network and network-attached components in the OAM system.

According to another aspect, methods are provided for operating and maintaining resources in a distributed network having a plurality of components. According to one example, a method can include providing an object-based representation of a network in a memory of a computer connected to the network. The object-based representation comprises objects linked together in the memory to form a hierarchy. Each of the objects represent the network or network-attached components connected to the network and operating in an operation and maintenance (OAM) system. In addition, each of the objects stores attribute information about the network or the network-attached-components with regard to the OAM system. The method can also include operating the network based on the object-based representation of the network.

The subject matter described herein for operating and maintaining resources in a distributed network may be implemented using a computer program product comprising computer executable instructions embodied in a computer readable medium. Exemplary computer readable media suitable for implementing the subject matter described herein include disk memory devices, programmable logic devices, and application specific integrated circuits. In addition, a computer readable medium that implements the subject matter described herein may be distributed across multiple physical devices and/or computing platforms.

BRIEF DESCRIPTION OF THE DRAWINGS

Exemplary embodiments of the subject matter will now be explained with reference to the accompanying drawings, of which.

DETAILED DESCRIPTION

Figure 1:
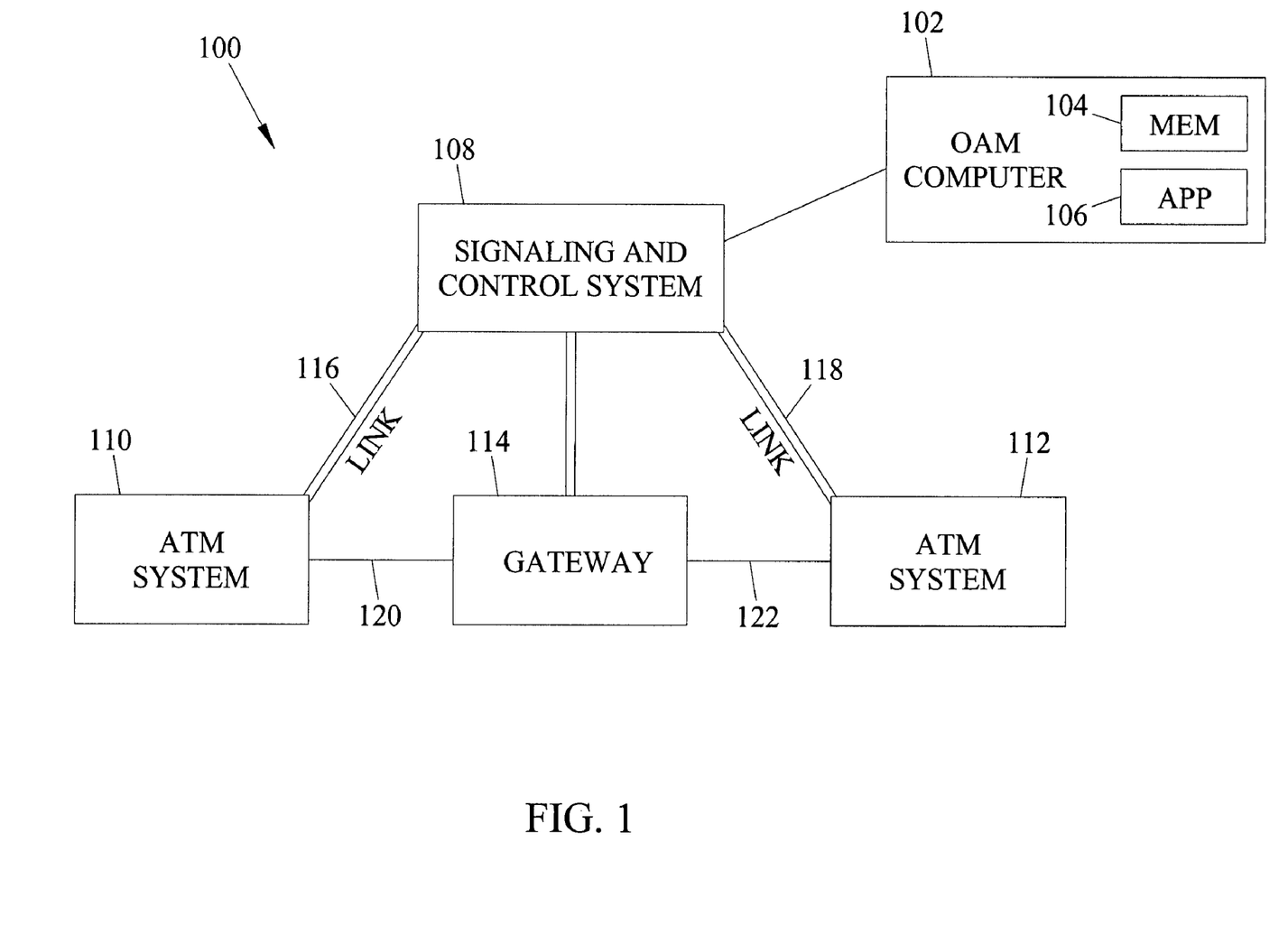
FIG. 1 is a schematic diagram of an exemplary distributed network having different resources operated and maintained by an operation and maintenance (OAM) computer according to an embodiment of the subject matter described herein.

The subject matter described herein includes methods, systems, and computer program products for operating and maintaining resources in a distributed network. FIG. 1 is a schematic diagram illustrating an exemplary distributed network 100 having different resources operated and maintained by an operation and maintenance (OAM) computer 102 according to an embodiment of the subject matter described herein. In this embodiment, network 100 is an asynchronous transfer mode (ATM) network. The subject matter described herein may be applied to network 100 for operation and maintenance functionality. As described in further detail herein, computer 102 can include a memory 104 for storing an object-based representation of network 100. Computer 102 can also include an application 106 for interpreting and utilizing the object-based representation of network 100 stored in memory 104 for operating and maintaining network 100 and its resources.

Network 100 can include a signaling and control system 108, ATM systems 110 and 112, and a gateway 114. ATM systems 110 and 112 are connected to system 108 by links 116 and 118, respectively. Gateway 114 is connected to ATM systems 110 and 112 via trunks 120 and 122, respectively. Links 116 and 118 can carry signaling traffic. Trunks 120 and 122 can transmit user data traffic. Network 100 may have many more components, links, and connections than are shown, but the number of these components, links, and connections has been restricted for clarity purposes. The subject matter described herein is also applicable to other types of communications networks, such as IP-based networks and TDM-based networks.

A network, such as ATM network 100, may include a plurality of resources that are operated and maintained. These resources can be associated with attribute information about the network for use by an operator in operating and maintaining the network. Exemplary resources for use in network 100 include a signaling gateway, such as the Newbridge 36170 gateway (available from Alcatel of Paris, France) and the AN2100® gateway (available from Tellabs, Inc. of Naperville, Ill., U.S.A.). In addition, network 100 can utilize a suitable protocol such as the Q.2931 protocol and the ISDN user part (ISUP) protocol. Network 100 may also include signaling interfaces (Sig IFs), ports, endpoints, and other suitable components that may be operated and maintained using the subject matter described herein. As appreciated by those of skill in the art, an ATM network may manage virtual paths and virtual channels, which may be managed by utilizing virtual path identifiers (VPIs) and virtual channel identifiers (VCIs), respectively.

According to an embodiment of the subject matter described herein, an object-based framework is provided for capturing aspects of a network, such as ATM network 100, that enable the implementation of OAM tasks. The object-based framework provides reusable and easily expandable programs for responding to new requirements of the OAM system of the network. In the object-based framework, each object is treated as an instance of a class. Objects may inherit the attributes of the class from which it is defined. According to an embodiment of the subject matter described herein, any suitable programming language may be utilized for producing an object-based framework for representing the network or network-attached components with regard to the OAM system.

In an object-based framework, objects may be defined by creating classes or generic objects which act as guides for instructing a compiler how to construct a child object. A class may specify the number and type of data variables and the steps involved in the functions which manipulate data. An object may be created by means of a function called a constructor which uses the corresponding class definition and additional information, such as arguments provided during object creation, to construct the object. Objects may be used by manipulating their data and invoking their functions. The objects described herein may be used to manipulate data and functions related to an OAM system.

Inheritance may be utilized for forming new classes or objects using predefined classes or objects where newly defined classes or objects take over the implementations and characteristics of the previously defined classes or objects. The classes and object described herein may be adapted by operators for providing new implementations of classes or objects with regard to the OAM system.

Objects may have one or more responsibilities for representing the network or network-attributes with regard to the OAM system. In order to cause an object to carry out one of its responsibilities, an application, such as application 106, may send a message to the object. In response, the object performs the corresponding task or service. Thus, in order to get an object to perform a service for which it is responsible, the first step is to create the object from the desired class using a constructor. The next step is to send a formatted message to the object to invoke the desired member function of the object.

Figure 2A:
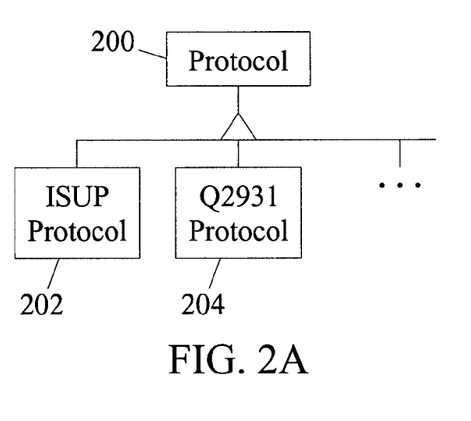
FIG. 2A is a hierarchy diagram that represents the relationship of a class and objects describing and representing protocols operating in a network according to an embodiment of the subject matter described herein.

FIGS. 2A-2G are exemplary hierarchy diagrams representing classes and objects that may be utilized for storing attribute information about a network, protocols utilized by the network, and network-attached components with regard to the OAM system according to an embodiment of the subject matter described herein. Referring specifically to FIG. 2A, a hierarchy diagram is illustrated that represents the relationship of a class (or generic object) and objects describing and representing protocols operating in a network according to an embodiment of the subject matter described herein. Protocol class 200 defines the number and type of data variables and functions for manipulating protocol-related data in an OAM system of a network. ISUP protocol object 202 and Q.2931 protocol object 204 inherit the definitions provided by class 200. Further, object 202 defines the ISUP protocol operating in the OAM system. Object 204 defines the Q.2931 protocol operating in the OAM system.

Figure 2B:
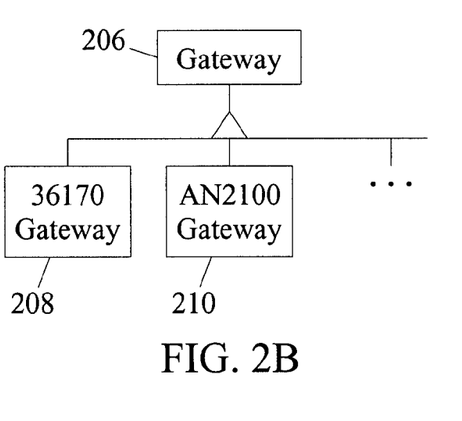
FIG. 2B is a hierarchy diagram that represents the relationship of a class and objects describing and representing gateways operating in a network according to an embodiment of the subject matter described herein.

Referring to FIG. 2B, a hierarchy diagram is illustrated that represents the relationship of a class (or generic object) and objects describing and representing gateways operating in a network according to an embodiment of the subject matter described herein. Class 206 defines the number and type of data variables and functions for manipulating gateway-related data in an OAM system of a network. 36170 gateway object 208 and AN2100® gateway object 210 inherit the definitions provided by class 206. Further, object 208 defines a 36170 gateway operating in the OAM system of the network. Object 204 defines an AN2100® gateway operating in the OAM system of the network.

Figure 2C:
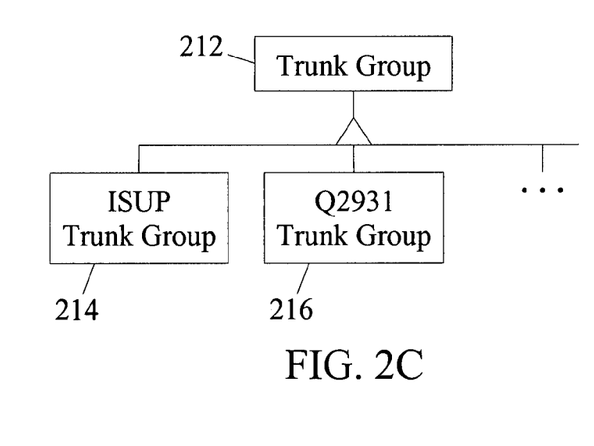
FIG. 2C is a hierarchy diagram that represents the relationship of a class and objects describing and representing trunk groups operating in a network according to an embodiment of the subject matter described herein.

Referring to FIG. 2C, a hierarchy diagram is illustrated that represents the relationship of a class (or generic object) and objects describing and representing trunk groups operating in a network according to an embodiment of the subject matter described herein. Class 212 defines the number and type of data variables and functions for manipulating trunk group-related data in an OAM system of a network. ISUP trunk group object 214 and Q.2931 trunk group object 216 inherit the definitions provided by class 212. Further, object 214 defines an ISUP trunk group operating in the OAM system of the network. Object 214 defines a Q.2931 trunk group operating in the OAM system of the network.

Figure 2D:
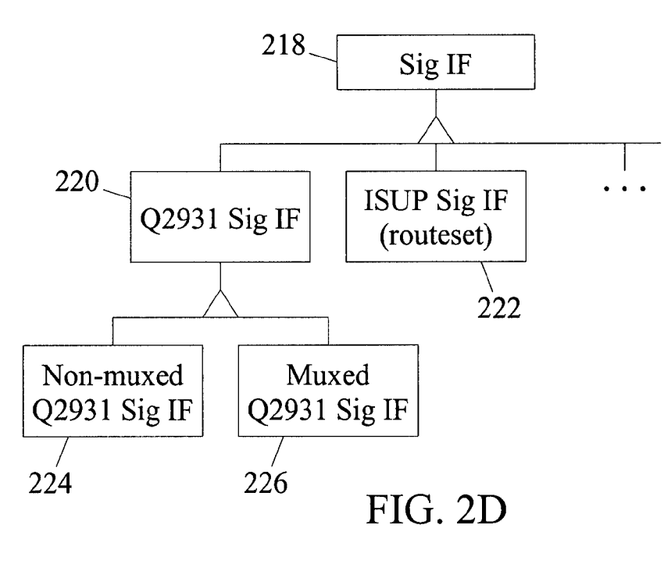
FIG. 2D is a hierarchy diagram that represents the relationship of classes and objects describing and representing signaling interfaces operating in a network according to an embodiment of the subject matter described herein.

Referring to FIG. 2D, a hierarchy diagram is illustrated that represents the relationship of classes (or generic objects) and objects describing and representing signaling interfaces operating in a network according to an embodiment of the subject matter described herein. Class 218 defines the number and type of data variables and functions for manipulating signaling interface-related data in an OAM system of a network. Class 220 and object 222 represent a class and an object, respectively, which inherit the definitions provided by the class 218. In particular, class 220 defines a Q.2931 signaling interface operating in the OAM system of the network. Object 222 defines an ISUP signaling interface operating in the OAM system of the network. Objects 224 and 226 inherit the definitions provided by the Q.2931 signaling interface classes 218 and 220. Object 224 defines a non-multiplexed Q.2931 signaling interface operating in the OAM system. Object 226 defines a multiplexed Q.2931 signaling interface operating in the OAM system.

Figure 2E:
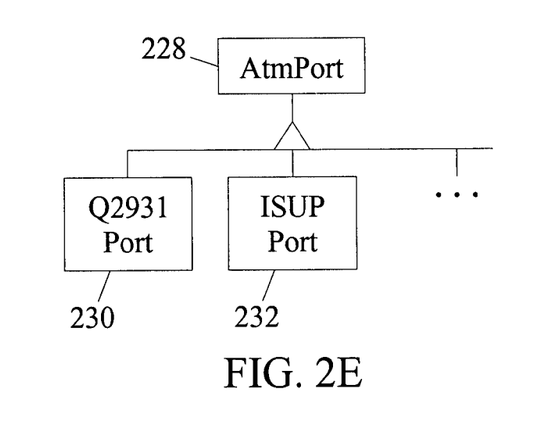
FIG. 2E is a hierarchy diagram that represents the relationship of a class and objects describing and representing ATM ports operating in an OAM system of an ATM network according to an embodiment of the subject matter described herein.

Referring to FIG. 2E, a hierarchy diagram is illustrated that represents the relationship of a class (or generic object) and objects describing and representing ATM ports operating in the OAM system of an ATM network according to an embodiment of the subject matter described herein. Class 228 defines the number and type of data variables and functions for manipulating ATM port-related data in an OAM system of the ATM network. Objects 230 and 232 inherit the definitions provided by the ATM port class 228. In particular, object 230 defines a Q.2931 ATM port operating in the OAM system. Object 232 defines an ISUP ATM port operating in the OAM system.

Figure 2F:
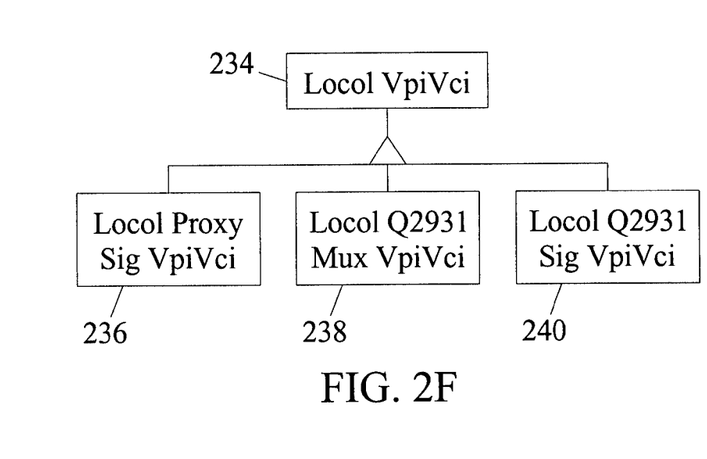
FIG. 2F is a hierarchy diagram that represents the relationship of a class and objects describing and representing a local VPI/VCI operating in an OAM system of an ATM network according to an embodiment of the subject matter described herein.

Referring to FIG. 2F, a hierarchy diagram is illustrated that represents the relationship of a class (or generic object) and objects describing and representing a local VPI/VCI operating in an OAM system of an ATM network according to an embodiment of the subject matter described herein. Class 234 defines the number and type of data variables and functions for manipulating local VPI and VCI-related data in the OAM system. Objects 236, 238, and 240 inherit the definitions provided by the local VPI/VCI class 234. In particular, object 236 defines a local proxy signaling VPI/VCI in the OAM system. Object 238 defines a local Q.2931 multiplexed VPI/VCI in the OAM system. Object 240 defines a local Q.2931 signaling VPI/VCI in the OAM system.

Figure 2G:
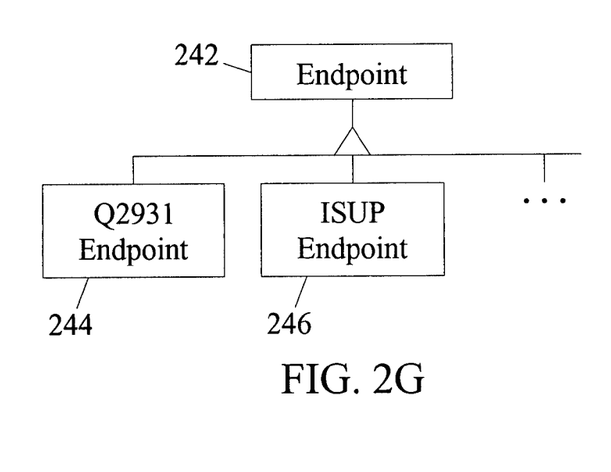
FIG. 2G is a hierarchy diagram that represents the relationship of a class and objects describing and representing endpoints operating in an OAM system of a network according to an embodiment of the subject matter described herein.

Referring to FIG. 2G, a hierarchy diagram is illustrated that represents the relationship of a class (or generic object) and objects describing and representing endpoints operating in an OAM system of a network according to an embodiment of the subject matter described herein. Class 242 defines the number and type of data variables and functions for manipulating endpoint-related data in the OAM system. Objects 244 and 246 inherit the definitions provided by the endpoint class defined by class 242. In particular, object 244 defines a Q.2931 endpoint operating in the OAM system. Object 246 defines an ISUP endpoint operating in the OAM system.

Figure 3:
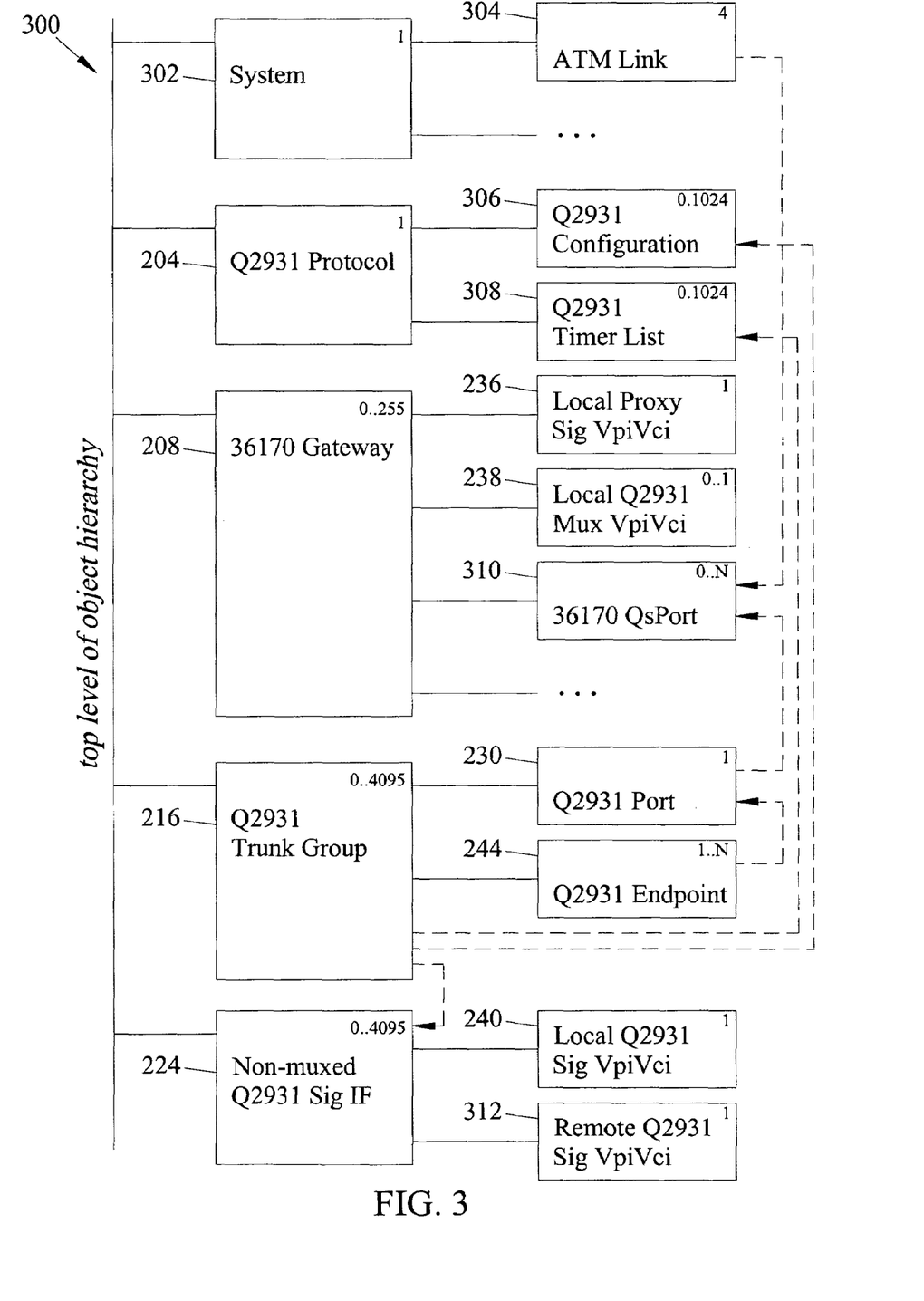
FIG. 3 is a hierarchy diagram of an object environment representing an ATM network according to an embodiment of the subject matter described herein.

FIG. 3 illustrates a hierarchy diagram of an object environment representing an ATM network, such as network 100, according to an embodiment of the subject matter described herein. The object environment can be stored in memory 104 and accessed by application 106. The objects in the object environment represent the ATM network and its components. Application 106 can interpret and utilize the object representation of the network for operating and maintaining the network and network-attached components in an OAM system. These objects are created and linked together in memory 104 to form a hierarchy 300.

A hierarchy can include one or more objects residing at its apex. In the embodiment shown in FIG. 3, hierarchy 300 includes a system object 302, Q.2931 protocol object 204, 36170 gateway object 208, Q.2931 trunk group object 216, and non-muxed Q.2931 signaling interface object 224. Objects 302, 204, 208, 216, and 224 share the apex, or top level, of hierarchy 300 for describing and representing network 100 for use in operating and maintaining network 100. Attributes of objects 302, 204, 208, 216, and 224 describe information on the operation and maintenance of network 100. In addition, objects 302, 204, 208, 216, and 224 can be defined to have a set of attributes, services, and relationships with each other and various other linked objects.

System object 302 may represent the ATM network. System object 302 can be utilized to group together components and attributes of the ATM network. Exemplary system attributes include system configuration and system-wide call processing parameters. System object 302 includes one instance, meaning there may be one instance of the system in the OAM representation.

Hierarchy 300 can also include various other objects linked with objects 302, 204, 208, 216, and 224 for further describing the network 100. For example, an ATM link object 304 can be linked to system object 302 in a parent-child relationship for organizing the objects into a hierarchy. In the example, ATM link object 304 describes and represents an ATM link operating in the ATM network. ATM link object 304 includes four instances, meaning there may be four instances of the ATM link in the representation of the OAM system. ATM link object 304 may include information about 36170 gateway ports to which a voice operated exchange (VoX) is physically linked.

Q.2931 protocol object 204 describes and represents the Q.2931 protocol operating in the ATM network. Object 204 may group together Q.2931 protocol-related attributes, such as trunk group parameter lists (or profiles) and timer lists. Object 204 includes one instance.

A Q.2931 configuration object 306 may be linked to Q.2931 protocol object 204 in a parent-child relationship. This object contains a list of protocol-specific parameters. Object 306 is referenced by Q.2931 trunk group object 216. Each trunk group of object 216 refers to object 306. Object 306 allows 0-1024 instances.

A Q.2931 timer list object 308 is connected to Q.2931 protocol object 204 in a parent-child relationship. This object contains a list of Q.2931 timers for use in the network. Each Q.2931 trunk group of object 216 references one such timer list defined by object 308. Object 308 allows 0-1024 instances. Further, each trunk group defined by object 216 references non-multiplexed Q.2931 signaling interface object 224.

36170 gateway object 208 describes and represents a 36170 gateway operating in the ATM network. Object 208 may group together 36170 gateway-related attributes and allow 0-255 instances.

Local proxy Sig VPI/VCI object 236 is connected to object 208 in a parent-child relationship. As stated above, object 236 defines a local proxy signaling VPI/VCI in the OAM system. Object 236 is related to class 234 by inheritance. In this example, object 236 includes one instance.

Local proxy Q.2931 Mux VPI/VCI object 238 is also connected to object 208 in a parent-child relationship. As stated above, object 236 defines a local proxy signaling VPI/VCI in the OAM system. Object 238 is related to class 234 by inheritance. In this example, object 238 includes 0 to 1 instances.

A 36170 QsPort object 310 is connected to object 208 in a parent-child relationship. This object describes and represents a 36170 gateway port operating in the ATM network. ATM link object 304 references object 310.

Q.2931 port object 230 is connected to object 216 in a parent-child relationship. Object 230 is related to class 228 (shown in FIG. 2) by inheritance. Object 230 specifies the port associated with the trunk group of object 216 and describes the characteristics of the port while it is in use by this trunk group. In this example, object 230 includes one instance. Object 230 references object 310.

Q.2931 endpoint object 244 specifies the endpoint associated with the trunk group of object 216 and describes the characteristics of the endpoint while it is in use by this trunk group. Object 244 may be connected to object 216 in a parent-child relationship. Object 244 is related to class 242 (shown in FIG. 2) by inheritance. In this example, object 244 includes 0-N instances and references object 230.

Local Q.2931 signaling VPI/VCI object 240 and remote Q.2931 signaling VPI/VCI object 312 are connected to object 224 in a parent-child relationship. Object 240 is related to class 234 by inheritance. Object 240 includes the VPI and VCI information for the VoX side of a backhaul switched virtual circuit (SVC), which may be unique among all local VPI and VCI. Object 312 includes the VPI and VCI for the integrated access device (IAD) side of the backhaul SVC.

Object-oriented pseudo code is provided hereinbelow for describing an ATM network. Different keywords known to those of skill in the art are utilized in the object-oriented code for describing the ATM network. Table 1 below includes examples of different keywords that may be used in object-oriented pseudo code for describing the ATM network.

TABLE 1

Keywords for Object-Oriented Pseudo Code Describing an OAM System of an ATM Network

| Keyword | Description |
| --- | --- |
| MAXINSTANCES | This keyword denotes the maximum allowable number of instances for a given object. |
| NONE | This keyword indicates that an attribute does not have a default value. |
| READONLY | This keyword qualifies an attribute that is not user-modifiable. |
| CRITICAL | This keyword qualifies an attribute having a value that can be assigned only once at the creation of the object. |
| KEY | This keyword denotes an attribute that is a simple key. |
| COMPKEY | This keyword denotes an attribute that is a part of a compound key. |
| DYNAMIC | This keyword qualifies an object that is automatically added by the system (i.e., an attribute not entered by an operator). |
| OPERATIONAL | This keyword qualifies an attribute having a value supplied by the system. No default is required for such an attribute. |
| NONNULL | For a reference, this keyword specifies that it must be non-null (i.e., it must point to some component (i.e., have an instance) which already exists. |
| UNIQUE | For a reference, this keyword specifies a one-to-one association. For example, if object A refers to a UNIQUE object B, then no other object C is allowed to refer to object B. When creating such an object A which tries to point to object B, an integrity check is required to ensure that object B is not already part of a one-to-one association with some object C. When object B is involved in more than one different one-to-one associations, then these can be distinguished by labels (e.g., UNIQUE(label1), UNIQUE(label2), etc.). |

According to an embodiment of the subject matter described herein, several rules apply for utilizing the objects, classes, and keywords in the object-oriented code. For example, in a class, when an attribute or set of attributes is denoted as KEY or KEYCOMP, then the value or the compound value is unique across all classes or objects derived from that class. As an example, if object A references object B, object B cannot be deleted. In a parent-child relationship of classes or objects, a child object cannot exist without its parent class or object. As a result, a parent cannot be deleted as long as it has children objects, and children objects may be deleted if a parent object or class is deleted.

Regarding instances, an object having multiple instances results in a table of objects. For an object having only one instance under a parent object, there is one object for each instance of the parent object if the parent object has more than one instance. For example, there is a table of objects that each point to the parent object, or the parent object includes all of the attributes defined by the child object. A top-level object with only one instance and no attributes is an envelope for grouping together related components.

The following is an example of a definition type for use in an object-oriented code for maintaining the state of the availability of trunks in an ATM network.

```
Type AvailabilityStateType :
    Enum [SwitchFailure(0x1), FacilityFailure(0x2),
        RouteFailure(0x4), Congestion(0x8),
        CircuitReset(0x10), ContinuityRetest(0x20),
        UserPartUnavailable(0x40)]
```

The state of the availability of trunks in this definition include switch failure, facility failure, route failure, congestion, circuit reset, continuity retest, and user part unavailable. Trunk availability may be determined by the information associated with this definition.

The following is an exemplary object-oriented pseudo code and associated description for system object 302 according to an embodiment of the subject matter described herein.

```
component System {
    instances    1
    description  "This is an envelope for grouping together the system
                  components. Examples: system configuration, system-
                  wide call processing parameters etc."
    // ... System attributes and components go in here
    component ATMLink {
        instances    4
        table        AtmLink    // new table
        qualifiers   DYNAMIC
        description  "These components specify the 4 ATM links on
                      VoX. They include the information about the
                      36170 ports VoX is physically linked to, which is
                      required e.g. when creating the Q2931 backhaul
                      SVCs (see also components Q2931SigIF)."
        attribute LinkPriority : enum [Primary(1), PrimaryBackup(2),
                                    Secondary(3),
                                    SecondaryBackup(4)] {
            default      NONE
            qualifiers   KEY, READONLY
            description  "Specifies the link priority, which is
                          used by the link redundancy schema."
        }
        reference Neighbor36170Port to UNIQUE 36170sPort
                                    By (NodeId, Shelf, Slot, Port) {
            default      NONE
            qualifiers   NONNULL
            description  "This associates the ATM link
                          (Primary, Secondary etc.) with a unique
                          physical port on the 36170."
        }
    } // end of Neighbor36170Port
    // ... other System components may go in here
} // end of System
```

The pseudo code description for system object 302 allows one instance and provides an envelope for grouping together system components and system attributes.

An example of code description for ATM link object 304 is included in the above code description of system object 302. The code for ATM link object 304 allows four instances, an attribute, and an object reference. The attribute is priority for the link, which may be utilized in a link redundancy schema. The object reference is to 36170 QsPort object 310, which associates the ATM link with a unique physical port on a 36170 gateway object, such as 36170 gateway object 208.

The following is an exemplary object-oriented pseudo code and associated description for Q.2931 protocol object 204.

```
component Q2931Protocol : Protocol {
    instances    1
    description  "This is an envelope for grouping
                  together Q2931-related components
                  like trunk group parameter lists (profiles),
                  timer lists etc."
    component Q2931Configuration {
        instances    0 ... 1024
        table        Q2931Configuration // similar to
                     IsupConfiguration
        description  "This is a trunk group parameters profile. It
                      contains a list of protocol-specific parameters
                      for a Q2931 trunk group. Each Q2931 trunk
                      group refers to exactly one such profile."
        attribute Id : integer [1 ... MAXINSTANCES] {
            default      NONE
            qualifiers   KEY, READONLY
            description  "Unique Id for this configuration
                          (profile)"
        }
        attribute Description : string [0 ... 15] {
            default ""
            description  "Description field for this profile."
        }
        attribute Q2931Variant : enum [ALTA(0)] {
            default      ALTA(0)
            qualifiers   CRITICAL
            description  "Specifies the Q2931 variant used for
                          signaling for this trunk group."
        }
        attribute RemoteExchangeType : enum [Iad(0), VoX(1)] {
            default      Iad(0)
            qualifiers   CRITICAL
            description  "Specifies whether this trunk
                          group connects VoX to an IAD or to
                          another VoX."
        }
        attribute Q2931Preferred : enum [no(0), yes(1)] {
            default      no(0)
            description  "Specifies whether or not incoming
                          calls on this trunk group are routed to
                          Q2931 routes before any other
                          route type (e.g. Isup)."
        }
        attribute ErrorTreatment : enum [tone_ann(1), release(2)] {
            default      release(2)
            description  "Specifies the behavior of the
                          call when a Q2931 Release message is
                          received on this trunk group."
        }
        attribute BearerCapabilityRoute : enum [no(0), yes(1)] {
            default      no(0)
            description  "Specifies whether or not incoming
                          calls on this trunk group are routed
                          based on the Bearer Capability IE."
        }
        attribute BearerCapability : enum [speech(0),
                                        unrestricted_64(8),
                                        restricted_64(9),
                                        audio_3_1(16),
                                        audio_7_0(17),
                                        video(24)] {
            default      speech(0)
            description  "Specifies the bearer capability
                          supported on this trunk group. In
                          order to be routed on this trunk group,
                          an outgoing call must match this
                          Bearer Capability."
        }
        attribute BearerCutThrough : enum [setup(0), alert(1),
                                        answer (2)] {
            default      origination(0)
            description  "Specifies when to complete the
                          bearer cut-through for calls on this
                          trunk group."
        }
```

-continued

```
        attribute EchoControlIncluded : enum [no(0), yes(1)] {
                default         yes(1)
                description     "Specifies, for incoming calls on
                                this JIP parameter, whenever the call
                                is outgoing on an ISUP trunk group and
                                the JIP parameter is required. NOTE:
                                the JIP data is always taken from
                                the incoming trunk group."
        }
        attribute CallingPartyNumberIncluded : enum [no(0), yes(1)] {
                default         yes(1)
                description     "Specifies, for outgoing calls on
                                this trunk group, whether or not the
                                Calling Party Number IE is to be
                                included in the outgoing
                                Q2931 Setup message."
        }
        attribute CallingPartyNumberRestricted : enum [no(0), yes(1)] {
                default         no(0)
                description     "Specifies, for incoming calls on
                                this trunk group, whether or not the
                                Calling Party Number has a presentation
                                restriction (i.e. is not allowed to be
                                included in the outgoing
                                origination message)."
        }
        attribute DefaultCallingPartyNumber : digits [0 . . . 15] {
                default         ""
                description     "Specifies, for incoming calls on
                                this trunk group, the default Calling
                                Party Number, whenever this IE is not
                                present in the incoming Q2931
                                Setup message."
        }
        attribute DefaultOriginatingLineInformation : integer [0 . . . 255] {
                default         0       //OLI = pots
                description     "Specifies, for incoming calls on
                                this trunk group, the default OLI, to be
                                included in the OLI parameter,
                                whenever the call is outgoing on an
                                Isup trunk group and the OLI parameter
                                is required."
        }
        attribute DefaultCallingPartyCategory : integer [0 . . . 255] {
                default         0
                description     "Specifies, for incoming calls on
                                this trunk group, the default CPC, to be
                                included in the CPC parameter,
                                whenever the call is outgoing on an
                                Isup trunk group and the CPC
                                parameter is required."
        }
        attribute BroadbandBearerClassUsed : enum [bcob_a(0),
                                bcob_x(1)] {
                default         bcob_a(0)
                description     "Specifies which broadband bearer
                                class to use in signaling for this
                                trunk group."
        }
attribute Q2931AddressleUsed : enum [cpnumber(0), cpsubaddress(1)] {
                default         cpsubaddress(1)
                description     "Specifies which IE contains
                                the address
information for calls on this trunk group."
        }
        } // end of Q2931Configuration
component Q2931TimerList {
        instances       0 . . . 1024
        table   Q2931TimesTable // similar to IsupTimersTable
        description     "Contains a list of Q2931 times. Each Q2931
                        trunk group refers to one such timer list."
        attribute Id : integer [1 . . . MAXINSTANCES] {
                default         NONE
                qualifiers      KEY, READONLY
                description     "Unique Id for a timer list."
        }
        attribute Description : string [0 . . . 15] {
                default         ""
                description     "Contains a text description of this timer list."
        }
        attribute T301 : integer [1 . . . 300] {
                default         180
                description     "Value of T301 timer (Alerting received)"
        }
        attribute T303 : integer [1 . . . 60] {
                default         180
                description     "Value of T303 timer (Setup sent)"
        }
        attribute T308 : integer [1 . . . 60] {
                default         30
                description     "Value of T308 timer (Release sent)"
        }
        attribute T309 : integer [1 . . . 60] {
                default         10
                description     "Value of T309 timer (SAAL down)"
        }
        attribute T309SW : integer [1 . . . 120] {
                default         30
                description     "Value of T309SW timer (switchover)."
        }
        attribute T310 : integer [1 . . . 60] {
                default         10
                description     "Value of T310 timer (awaiting Connect,
                                Alerting or Release)"
        }
        attribute T316 : integer [1 . . . 300] {
                default         120
                description     "Value of T316 timer (Restart sent)"
        }
        attribute T322 : integer [1 . . . 60] {
                default         4
                description     "Value of T322 timer (Status Enq. Sent)"
        }
        } // end of Q2931TimerList
} // end of Q2931Protocol
```

The pseudo code description for Q.2931 protocol object 204 allows one instance and provides an envelope for grouping together protocol components and attributes, such as trunk group parameters lists and timer lists.

An example of code description for Q.2931 configuration object 306 is included in the above pseudo code description for Q.2931 protocol object 204. The pseudo code description for Q.2931 configuration object 306 allows 0-1024 instances. Object 306 includes an Id attribute for uniquely identifying this profile of the object. Further, the pseudo code for object 306 includes a Description attribute for providing a description field. A Q2931 Variant attribute is provided for specifying the Q.2931 variant used for signaling for this trunk group. A RemoteExchangeType attribute is provided for specifying whether the trunk group connects VoX to an IAD or to another VoX. A Q2931 Preferred attribute is provided for specifying whether incoming calls on the trunk group are routed to Q.2931 routes before any other route type, such as ISUP. An ErrorTreatment attribute is provided for specifying the behavior of the call when a Q.2931 release message is received on this trunk group.

The pseudo code for object 306 also includes a BearerCapabilityRoute attribute for specifying whether incoming calls on this trunk group are routed based on the ATM Bearer Capability IE (information element). The ATM Bearer Capability IE carries ATM-specific parameters for the characterization of an ATM bearer service, such as ATM transfer mode, connection mode, traffic type, and end-to-end timing. A BearerCapability attribute is provided for specifying the bearer capability supported on this trunk group. The Bearer Capability must be matched in order to be routed on this trunk group. A BearerCutThrough attribute is provided for specifying when to complete the bearer cut-though for calls on this trunk group.

Further, the pseudo code for object 306 includes an EchoControlIncluded attribute for specifying whether an echo control device has been included (e.g., by the IAD).

A JipData attribute is provided for specifying, for incoming calls on this trunk group, the data to be used for a jurisdiction information parameter (JIP) when the call is outgoing on an ISUP trunk group and the JIP is required.

A CallingPartyNumberIncluded attribute is provided for specifying, for outgoing calls on this trunk group, whether the call party number IE is to be included in the outgoing Q.2931 Setup message.

A CallingPartyNumberRestricted attribute is provided for specifying, for incoming calls on this trunk group, whether the calling party number has a presentation restriction (i.e., the calling party number is not allowed to be included in the outgoing origination message).

A DefaultCallingPartyNumber attribute is provided for specifying, for incoming calls on this trunk group, the default calling party number, when the associated IE is not present in the incoming Q.2931 setup message.

DefaultOriginatingLineInformation attribute is provided for specifying, for incoming calls on this trunk group, the default originating line information (OLI) to be included in the OLI parameter, whenever the call is outgoing on an ISUP trunk group and the OLI parameter is required.

A DefaultCallingPartyCategory attribute is provided for specifying, for incoming calls on this trunk group, the default calling party category (CPC), to be included in the CPC parameter, when the call is outgoing on an ISUP trunk group and the CPC parameter is required.

A BroadbandBearerClassUsed attribute is provided for specifying which broadband bearer class to use in signaling for this trunk group.

A Q2931AddressIeUsed attribute is provided for specifying which IE contains the address information for calls on this trunk group.

An example of pseudo code and associated description for Q.2931 timer list object 308 is included in the above pseudo code listing for Q.2931 protocol object 204. The pseudo code for Q.2931 timer list object 308 allows 0-1024 instances. The attributes described in the pseudo code for object 308 include a unique identifier for a timer list. Further, the pseudo code for object 308 includes a description attribute for containing a text description of this timer list. Different attributes are also included for values of a T301 timer, a T303 timer, a T308 timer, a T309 timer, a T309SW timer, a T310 timer, a T316 timer, and a T322 timer. A T301 timer, for example, times until a connect or release complete signal is received. A T303 timer times the delay in network response when the system sends a setup message to initiate an outgoing call. A T308 timer times the delay in network response when the system sends a release message to clear a call. A T309 timer times the duration of a link failure. A T310 timer times the network delay following the receipt of a call-preceding message on an outgoing call.

The following is exemplary object-oriented pseudo code and associated description for 36170 gateway object 208.

```
component 36170Gateway : Gateway {
    instances    0 ... 255
    table        QsNode     // combined with info in table AtmNode
    description  "The 36170 gateway."
```

-continued

```
    attribute Id : integer [1 ... MAXINSTANCES] {
        default      NONE
        qualifiers   KEY, READONLY
        description  "Node number, as assigned by the 46020."
    }
    attribute NsapPrefix : hexdigits [26] {
        default      NONE
        description  "The node's NSAP prefix. Required
                      when creating SVCs."
    }
    component 36170QsPort {
        instances    0 ... N
        table        QsPort
        qualifiers   DYNAMIC
        description  "Specifies a 36170 port. Automatically filled
                      in by the system based on information from
                      the 46020."
        reference NodeId to 36170Gateway by Id {
            default      NONE
            qualifier    COMPKEY, NONNULL,
                         OPERATIONAL, READONLY
            description  "Points to the 36170Gateway (node)
                          this port belongs to. The node contains the NSAP
                          prefix."
        }
        attribute Shelf : integer [1 ... 16] {
            default      NONE
            qualifier    COMPKEY, OPERATIONAL,
                         READONLY
            description  "Shelf number. Added to NSAP prefix."
        }
        attribute Slot : integer [1 ... 12] {
            default      NONE
            qualifier    COMPKEY, OPERATIONAL,
                         READONLY
            description  "Slot number. Added to NSAP prefix."
        }
        attribute Port : integer [1 ... 8] {
            default      NONE
            qualifier    COMPKEY, OPERATIONAL,
                         READONLY
            description  "Port number. Added to NSAP prefix."
        }
        attribute PortType : enum [ATMPort_T1(0), ATMPort_E1(1),
                                   ATMPort_OC3(2)] {
            qualifiers   OPERATION, READONLY
            description  "Specifies the port type."
        }
        // ... other attributes go in here
    } // end of 36170QsPort
    // ... other 36170Gateway components may go in here
} // end of 36170Gateway
```

The pseudo code for 36170 gateway object 208 allows 0-255 instances and provides an envelope for grouping together 36170 gateway components and attributes. The pseudo code for object 208 includes an Id attribute for the node number assigned to the 36170 gateway. An NsapPrefix attribute is provided for the node's network service access protocol (NSAP) prefix, which is required when creating SVCs.

Further, the envelope provided by object 208 includes a description of 36170 QsPort object 310. Object 310 allows 0-N instances. The pseudo code for object 310 points to the 36170 gateway to which this port belongs. The pseudo code for object 208 also includes a Shelf attribute to indicate a shelf number for the port. Further, object 208 includes a Slot attribute, a Port attribute, a PortType attribute for specifying a slot number, a port number, and a port type, respectively.

The following is exemplary object-oriented pseudo code and description for trunk group class 212.

```
generic TrunkGroup {
    instances    0..4095
    description  "This generic component is the base class for
                  any trunk group. It defines the protocol-independent
                  parameters (i.e. which are common to all
                  trunk groups)."
    attribute Id : integer [1 . . . MAXINSTANCES] {
        default      NONE
        qualifiers   KEY, READONLY
        description  "Unique Id for a trunk group."
    }
    attribute Name : string [0 . . . 15] {
        default      ""
        description  "Contains a name or description string for
                      this trunk group."
    }
    attribute Type : enum [TG_ISUP(1), TG_ISUPVIRTUAL(2),
                    TG_PRI(3), TG_Q2931(4)] {
        default      NONE
        qualifiers   CRITICAL
        description  "Defines the signaling protocol for this
                      trunk group."
    }
    attribute Direction : enum [in(1), out(2), both(3)] {
        default      both(3)
        description  "Specifies the direction in which calls are allowed
                      for this trunk group."
    }
    attribute EndpointSelection : enum [roundRobin(0), topDown(1),
                    bottomUp(2)] {
        default      roundRobin(0)
        description  "Specifies the endpoint selection strategy for this
                      trunk group."
    }
    attribute OriginatingCoS : integer [0 . . . 32] {
        default      0
        description  "Specifies the class of service (COS) for calls
                      originating on this trunk group."
    }
    attribute TerminatingCoS : integer [0 . . . 32] {
        default      0
        description  "Specifies the class of service (COS) for calls
                      terminating on this trunk group."
    }
    reference InitialSlpId to Slp by Id {
        default      Id(0)
        integrity    (if Direction != out(2)
                         then InitialSlpId != Id(0)
                     )
        description  "Unless ANI screening fails, this is the initial SLP
                      executed for calls originating on this
                      trunk group."
    }
    attribute AniScreening : enum [no(0), yes(1)] {
        default      no(0)
        description  "Specifies whether ANI is required or not for this
                      trunk group."
    }
    attribute AniExpected : enum [no(0), yes(1)] {
        default      no(0)
        description  "Specifies whether ANI is required or not
                      for calls originating on this trunk group. If
                      required and not available, the "unknown ANI"
                      SLP is executed."
    }
    reference UnknownAniSlspID to Slp by Id {
        default      Id(0)   // null reference
        integrity    (if Direction != out(2) && AniExpected = yes(1)
                         then InitialSlpId != Id(0)
                     )
        description  "Unless ANI screening fails, this is the initial SLP
                      executed for calls originating on this
                      trunk group."
    }
```

```
                            -continued reference PretranslationId to PretranslationTable by Id {
        default      Id(0)
        integrity    (if Direction != out(2) &&
                      System.CallProcessing.SystemPretransId == Id(0)
                      Then PretranslationId != Id(0)
                     )
        description  "This specifies the pretranslation table used for
                      incoming calls on this trunk group. If configured,
                      overrides the system-wide default pretranslation
                      table."
    }
    reference NoaId to NoaTable by Id {
        default      NoaId(0)
        description  "Specifies the Nature of Address (NOA) table for
                      this trunk group. If configured, overrides the
                      system-wide default NOA table. This table is used
                      to match the NOA of an incoming call. If no
                      match is found, then the pretranslation table is
                      used to match dialed digits."
    }
} // end of TrunkGroup
```

The pseudo code for trunk group class 212 allows 0-4095 instances and provides a base class (or generic object) for children trunk group objects. Class 212 defines protocol-based attributes and parameters which may be common to many trunk groups. An Id attribute is provided for the identifier assigned to the trunk group. A Name attribute is provided for containing a name or description string for the trunk group.

Class 212 also includes a Type attribute, a Direction attribute, an EndpointSelection attribute, an OriginatingCoS attribute, a TerminatingCoS attribute, an AniScreening attribute, and an AniExpected attribute. The Type attribute is provided for defining a signaling protocol for this trunk group. The Direction attribute is provided for specifying the direction in which calls are allowed for this trunk group. The EndpointSelection attribute is provided for specifying the endpoint selection strategy for the trunk group. The OriginatingCoS attribute is provided for specifying the class of service (COS) for calls originating on the trunk group. The TerminatingCoS attribute is provided for specifying the COS for calls terminating on the trunk group. The AniScreening attribute is provided for specifying whether automatic number identification (ANI) is required for the trunk group. The AniExpected attribute is provided for specifying whether ANI is required for calls originating on the trunk group.

Class 212 includes four object references. References InitialSlpId and UnknownAniSlspID specify single link procedures (SLPs) executed for calls originating on this trunk group.

A reference PretranslationId specifies the pretranslation table used for incoming calls on this trunk group. A system-wide default pretranslation table is overridden if this reference is configured.

A reference NoaId specifies a nature of address (NOA) table for this trunk group. The system-wide default NOA table is overridden if this reference is configured. The NOA table is utilized to match the NOA of an incoming call. If no match is found, the pretranslation table is used to match dialed digits.

The following is exemplary object-oriented pseudo code and associated description for ATM port class 228.

```
generic Atmport {
    instances      0 . . . 36170QsPort.MAXINSTANCES
    table AtmPort
    description    "Describes a 36170 port while it is in use by
                   a trunk group.
                        (NOTE: In addition, the components 36170QsPort
                        in table QsPort represent all the available ports, as
                        reported by the 46020.)"
    reference QsPort to UNIQUE 36170QsPort
        by (NodeId, Shelf, Slot, Port) {
        default        NONE
        qualifiers     COMPKEY, NONNULL
        description    "Refers to the physical 36170 port in
                       table QsPort. Table QsPort is dynamically filled
                       in by the system, based on information reported
                       by the 46020."
    }
    attribute PortType : enum [ATMport_T1 (0), ATMPort_E1 (1),
                ATMPort_OC3(2)] {
        default        36170Port [Port].PortType //This means value is
        qualifiers     READONLY // the same as in QsPort table
        description    "Specifies the port type."
    }
    attribute       BearerVpi : integer [0 . . . 255] {
        default        (if (PortType == ATMPort_OC3(2))
                            then default == 1
                            else default == 0
                       )
        qualifiers     CRITICAL
        description    "VPI to be used for bearer channels. Default
                       varies depending on port type."
    }
    attribute UsageType : enum [unused (0), isup (1), pri (2), ivr (3),
                tas (4), q2931 (5)] {
        qualifiers     OPERATIONAL, READONLy
        description    "Usage type is filled in by the system, depending
                       on the type of the trunk group this port is
                       associated to."
    }
    attribute AdministrativeState : enum [locked (0), unlocked (1)] {
        default        unlocked (0)
        description    "This is the administrative state of the port. Each
                       port can be locked/unlocked individually."
    }
    attribute OperationalState : enum [disabled (0), enabled (1)] {
        qualifiers     OPERATIONAL, READONLY
        description    "This is the operational state."
    }
} // end of AtmPort
```

The pseudo code for ATM port class 228 allows 0 to a number of maximum instances that is the same as 36170 QsPort object 310. Class 228 describes a port of a 36170 gateway while it is in use by a trunk group.

Class 228 includes five attributes. A PortType attribute is provided for specifying the port type. A BearerVpi attribute is provided when VPI is used for bearer channels. Data in the UsageType attribute is filled in by the system depending on the type of the associated trunk group. An AdministrativeState attribute includes the administrative state of ATM ports. Each port defined in the AdministrativeState attribute can be locked and unlocked individually. An OperationalState attribute specifies the operational state of the ATM port.

Further, class 228 includes a QsPort reference. Class 228 references 36170 QsPort object 310, which associates the ATM link with a unique physical port on a 36170 gateway object, such as 36170 gateway object 208.

The following is exemplary object-oriented pseudo code and associated description for endpoint class 242.

```
generic Endpoint {
    instances      0 . . . 32256
    table          AtmEndpoint
    qualifiers     DYNAMIC
    description    "This is the base (or generic object) class for all
                   types of endpoints (ISUP, Q2931 . . . ). These dynamic
                   components are automatically added by the system
                   based on the start VCI and the total number
                   of endpoints defined on a port.
                   NOTE: Specific endpoints may have additional
                   attributes, for example, an ISUP endpoint also has
                   Cic and Remote Administrative State."
    attribute BearerVci : integer [0 . . . 65535] {
        default        NONE
        qualifiers     OPERATIONAL, READONLY
        description    "The VCI of this endpoint. Filled in by the system
                       based on the start VCI and the total number of
                       VCIs."
    }
    attribute CallState : enum [onhook (1), offhook (2), busy (3)] {
        qualifiers     OPERATIONAL, READONLY
        description    "The call processing state of this endpoint."
    }
    reference ConnectedEndpointPort to 36170QsPort
                        by (NodeId, Shelf, Slot, Port) {
        qualifiers     OPERATIONAL, READONLY
        description    "In case this endpoint is connected as part
                       of a call, specifies the port of the connected
                       (other) endpoint."
    }
    attribute ConnectedEndpointVpi : enum [disabled (0), enabled (1)] {
        qualifiers     OPERATIONAL, READONLY
        description    "In case this endpoint is connected as part of
                       a call, specifies the VCI of the connected (other)
                       endpoint."
    }
    attribute AdministrativeState : enum [unlocked (0), locked (1),
                        shutdown (2)] {
        default        unlocked (0)
        description    "Specifies the administrate state of the endpoint.
                       When locking, an existing call is allowed to
                       finish. On shutdown, an existing call is cleared."
    }
    attribute OperationalState : enum [disabled (0), enabled (1)] {
        qualifiers     OPERATIONAL, READONLY
        description    "Specifies the operational state of the interface."
    }
    attribute AvailabilityState : set of AvailabilityStateType {
        qualifiers     OPERATIONAL, READONLY
        description    "Specifies the availability state of the interface."
    }
} // end of Endpoint
```

The pseudo code for endpoint class 242 allows 0-32256 instances. Class 242 describes the base class for all types of suitable endpoints, such as ISUP and Q.2931 endpoints. These are dynamic objects which are automatically added by the system based on the start VCI and the total number of endpoints defined on a port. Some endpoints may have additional attributes. For example, an ISUP endpoint also has circuit identifier code (CIC) and remote administrative state.

Endpoint class 242 includes six attributes. A BearerVci attribute specifies the VCI of the endpoint. A CallState attribute specifies the call processing state of the endpoint.

A ConnectedEndpointVpi attribute specifies the VPI of the connected other endpoint if this endpoint is connected as part of a call. The ConnectedEndpointVci attribute specifies the VCI of the connected other endpoint.

An AdministrativeState attribute is provided for specifying the administrative state of the endpoint. When locking, an existing call is allowed to finish. On shutdown, an existing call is cleared.

An OperationalState attribute is provided for specifying the operational state of the interface.

An AvailabilityState attribute is provided for specifying the availability state of the interface.

Endpoint class 242 also includes a ConnectedEndpointPort reference. When this endpoint is connected as part of a call, this reference specifies the VCI of the other connected endpoint.

The following is exemplary object-oriented pseudo code and associated description for Q.2931 trunk group object 216.

```
component Q2931TrunkGroup : TrunkGroup {
    table          ITrunkGroup // together with ISUP trunk groups
    integrity      (TrunkGroup.Type == TG_Q2931 (4))
    description    "This component defines a Q2931 trunk group.
                    It inherits all the attributes from TrunkGroup."
    reference Q2931ConfigurationId to Q2931Configuration by Id {
        default        NONE
        qualifiers     NONNULL
        description    "Specifies the Q2931 configuration (profile)
                        associated with this trunk group."
    }
    reference      Q2931TimerListId to Q2931TimerList by Id {
        default        NONE
        qualifiers     NONNULL
        description    "Specifies the Q2931 timer table (profile)
                        associated with this trunk group."
    }
    reference Q2931SignalingIfId to UNIQUE Q2931SignalingIf
                    by (Id, MuxId) {
        default        NONE
        qualifiers     NONNULL, CRITICAL
        description    "Specifies the Q2931 signaling interface which
                        controls this trunk group."
    }
    component Q2931 : AtmPort {
        instances      1
        table          AtmPort
        integrity      (UsageType == Q2931 (5))
        description    "Specifies the port associated with this
                        trunk group, i.e. describes the characteristics
                        of the port while it is in use by this trunk group."
    } // end of Q2931Port
    component Q2931 : Endpoint {
        instances      1 ... N
                        (if Q2931Port.PortType == ATMPort_OC3
                            then N == 2000
                            else N == 20
                        )
        table AtmEndpoints
        qualifiers     DYNAMIC
        description    "This is a Q2931 endpoint, which has the same
                        attributes as the basic (generic) endpoint."
    } // endpoint of Q2931Endpoint
}   // end of Q2931TrunkGroup
```

The pseudo code for Q.2931 trunk group object 216 describes a Q.2931 trunk group and inherits all of the attributes defined by trunk group class 212.

Trunk group object 216 includes three references. A Q2931 ConfigurationId reference specifies the Q.2931 configuration profile associated with this trunk group. A Q2931 TimerListId reference specifies a Q.2931 timer table profile associated with this trunk group. A Q2931 SignalingIfId specifies the Q.2931 signaling interface which controls this trunk group.

As stated above, object 216 is a parent of Q.2931 port object 230 and Q.2931 endpoint object 244. Q.2931 port object 230 is provided for specifying the port associated with the trunk group, i.e., the object describes the characteristics of the port while it is in use by the trunk group. Q.2931 endpoint object 244 defines a Q.2931 endpoint.

The following is exemplary object-oriented pseudo code and associated description for local VPI/VCI class 236.

```
generic LocalVpiVci {
    description    "A VPI.VCI pair on an ATM card on VoX. Used
                    for the Q2931 signaling interfaces (backhauls), as
                    well as for the interfaces to the signaling API on
                    the 36170s (muxed and non-muxed)."
    attribute Vpi : integer [0 ... 255] {
        default        0
        qualifiers     COMPKEY, READONLY
        description    "VPI value, for SunATM it is always 0."
    }
    attribute Vci : integer [0 ... 1023] {
        default        NONE
        qualifiers     COMPKEY
        description    "VCI value, for SunATM it is maximum 1023."
    }
} // end of LocalVpiVci
```

The pseudo code for local VPI/VCI class 236 describes a VPI/VCI pair on an ATM card on VoX. Class 236 may be utilized for Q.2931 signaling interfaces and for the interfaces to the signaling application program interface (API) on the 36170 gateways. Class 236 includes VPI and VCI attributes for VPI and VCI values, respectively.

The following is exemplary object-oriented pseudo code and associated description of remote Q.2931 signaling VPI/VCI object 312.

```
generic RemoteVpiVci {
    description    "A VPI.VCI pair for the remote side of a signaling
                    backhaul VCC. By default, this is the Q2931 signaling
                    channel value of 0.5."
    attribute      Vpi : integer [0 ... 255] {
        default        0
        description    "The VPI value."
    }
    attribute      Vci : integer [0 ... 65535] {
        default        5
        description    "The VCI value."
    }
}    // end of RemoteVpiVci
```

The pseudo code for remote VPI/VCI object 312 describes a VPI/VCI pair for the remote side of a signaling backhaul virtual channel connection (VCC). The pseudo code for object 312 includes VPI and VCI attributes for VPI and VCI values, respectively.

The following is exemplary object-oriented pseudo code and associated description for Q.2931 signaling interface class 220.

```
generic Q2931SignalingIf {
    instances      0..4095
    table          Q2931SigIntf       // new table
    description    "This is a Q2931 signaling interface. Every Q2931
                    trunk must refer to exactly one such interface."
    attribute Id : integer [1..MAXINSTANCES] {
        default        NONE
        qualifiers     KEY, READONLY
        description    "The unique Id for a signaling interface."
    }
    attribute Description : string [0..15] {
        default        ""
        description    "Contains a description string for this signaling link,
                        e.g. the IAD it connects to."
    }
```

-continued

```
attribute Side : enum [network (0), user (1)] {
    default       network (0)
    description   "Specifies whether this interface is user side or
                  network side (cf. Q2931)."
}
attribute AdministrativeState : enum [unlocked (0), locked (1)] {
    default       unlocked (1)
    qualifiers    READONLY
    description   "Specifies the admin state of the interface, which
                  depends on the state of its port. (The interface
                  cannot be locked or unlocked by itself.)"
}
attribute OperationalState : enum [disabled (0), enabled (1)] {
    qualifiers    OPERATIONAL, READONLY
    description   "This is the Q2931 state of the interface. Layer 3
                  state "Up" maps to enabled, all other states map to
                  disabled."
}
attribute Layer2MainState : enum [out_of_service (0), connecting (1),
                                  in_service (2)] {
    qualifiers    OPERATIONAL, READONLY
    description   "This is the layer 2 (SSCOP) state. The Main
                  SSCOP is defined as either the Primary (on the
                  active host) or the Secondary (on the standby
                  host)."
}
attribute Layer2BackupState : enum [out_of_service (0),
                                    connecting (1),
                                    in_service (2)] {
    qualifiers    OPERATIONAL, READONLY
    description   "This is the layer 2 (SSCOP) state. The Backup
                  SSCOP is defined as either the Primary Backup
                  (on the active host) or the Secondary Backup (on
                  the standby host)."
}
component RemoteQ2931SignalingVpiVci : RemoteVpiVci {
    instances     1
    description   "Contains the VPI and VCI (inherited from
                  RemoteVpiVci) for the IAD side of the backhaul
                  SVC."
}    // end of RemoteQ2931SignalingVpiVci
}    // end of Q2931SignalingIf
```

The pseudo code for Q.2931 signaling interface class 220 allows 0-4095 instances. Class 220 describes a Q.2931 signaling interface. Each Q.2931 trunk refers to one such interface.

Class 220 includes seven attributes. An Id attribute is a unique identifier for a signaling interface. A Description attribute contains a description string for this signaling link (e.g., the IAD to which it is connected). A Side attribute is provided for specifying whether this interface is user side or network side. An AdministrativeState attribute is provided for specifying the administrative state of the interface. The administrative state of the interface depends on the state of its port.

An OperationalState attribute is the Q.2931 state of the interface. Layer 3 state "Up" maps to enabled. All other states map to disabled.

A Layer2MainState attribute is the layer 2 state. The Main service specific connection-oriented protocol (SSCOP) is defined as either the Primary (on the active host) or the Secondary (on the standby host).

A Layer2BackupState attribute is the backup layer 2 state. The backup SSCOP is defined as either the Primary backup (on the active host) or the Secondary backup (on the standby host).

Further, class 220 includes remote Q.2931 signaling VPI/VCI object 312. Object 312 includes the VPI and VCI from the IAD side of the backhaul SVC.

The following is exemplary object-oriented pseudo code and associated description for non-muxed Q.2931 signaling interface object 224.

```
component NonMuxedQ2931SignalingIf : Q2931SignalingIf {
    description   "This is a non-muxed interface: only one signaling
                  interface per LocalVpiVci."
    component LocalQ2931SignalingVpiVci : LocalVpiVci {
        instances     1
        description   "Contains the VPI and VCI (inherited from
                      LocalVpiVci) for the VoX side of the backhaul
                      SVC. Must be unique among all LocalVpiVci."
    }    // end of LocalQ2931SignalingVpiVci
}    // end of NonMuxedQ2931SignalingIf
```

The pseudo code for non-muxed Q.2931 signaling interface object 224 describes a non-muxed interface with only one signaling interface per local VPI/VCI. Object 224 includes local Q.2931 signaling VPI/VCI object 240. Object 240 inherits attributes from local VPI/VCI class 234 and contains the VPI and VCI for the for the VoX side of the backhaul SVC.

The following is exemplary object-oriented pseudo code and associated description for muxed Q.2931 signaling interface object 226.

```
component MuxedQ2931SignalingIf : Q2931SignalingIf {
    description   "This is a muxed interface: several signaling interfaces
                  per LocalVpiVci, distinguished by their mux id."
    reference     LocalQ2931SignalingVpiVci to
                  LocalQ2931MuxVpiVci by (Vpi, Vci) {
        qualifiers    COMPKEY, NONNULL
        description   "Refers to the component (under 36170Gateway)
                      which contains the VPI and VCI for the VoX
                      side of the muxed signaling VCC."
    }
    attribute MuxId : integer [1..255] {
        default       NONE
        qualifiers    COMPKEY
        description   "Zero for a non-muxed interface (for now), or the
                      mux Id for a muxed interface (future)."
    }
}    // end of MuxedQ2931SignalingIf
```

The pseudo code for muxed Q.2931 signaling IF object 226 describes a multiplexed interface. There are several signaling interfaces per local VPI/VCI and are distinguished by their multiplexer identifier. The pseudo code for object 226 includes a MuxId attribute for identifying the multiplexer.

Further, the pseudo code for object 226 includes a local Q.2931 signaling VPI/VCI object 240, which refers to local Q.2931 multiplexer VPI/VCI object 238. Object 238 is a child object of 36170 gateway object 208 and contains the VPI and VCI for the VoX side of the multiplexed signaling VCC.

The above exemplary object-oriented pseudo code and description may be stored in a memory, such as memory 104 and accessed by application 106 for representing an ATM network and its components. Objects representing instances of classes (or generic objects) defined in the pseudo code can store information about the network with regard to an OAM system. Further, application 106 can interpret and utilize the objects for operating and maintaining the network and its components in the OAM system. The code description can also be modified to include additional objects for representing other components of an ATM network with regard to the OAM system.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for operating and maintaining resources in a distributed network, the system comprising:
   (a) a computer comprising a memory and in communication with a network comprising a plurality of network-attached components operating in an operation and maintenance (OAM) system;
   (b) an object-based representation of the network stored in the memory, wherein the object-based representation comprises objects linked together in the memory to form a hierarchy, wherein each of the objects represent the network or the network-attached components, wherein the object-based representation includes a signaling protocol object that contains and groups together attributes of a signaling protocol used in the network, wherein each of the objects stores attribute information about the network or the network-attached components with regard to the OAM system; and
   (c) an application for interpreting and utilizing the object-based representation of the network for operating and maintaining the network and network-attached components in the OAM system, wherein the application uses the objects in the object-based representation to provide OAM services to the network and the network-attached components, wherein the object-based representation comprises first and second objects, wherein the first object comprises first predefined attributes, wherein the second object inherits the first predefined attributes of the first object, and the second object comprises second predefined attributes different from the first predefined attributes.

2. The system of claim 1 wherein the object-based representation comprises a system object at an apex of the hierarchy, wherein the system object represents the network.

3. The system of claim 2 wherein the object-based representation includes a plurality of network-attached device objects describing and representing the network-attached components, the network-attached device objects being linked to the system object.

4. The system of claim 3 wherein the network-attached components comprise components selected from the group consisting of a gateway, a trunk, a port, and an endpoint.

5. The system of claim 2 wherein the signaling protocol object is linked to the system object.

6. The system of claim 5 wherein the signaling protocol object comprises a Q.2931 protocol object.

7. The system of claim 1 wherein each object is defined to comprise relationships with other objects and a set of attributes containing associated attribute information.

8. The system of claim 1 wherein the objects comprise predefined attributes about the network or network-attached component.

9. The system of claim 1 comprising a systems manager for retrieving information from the network components, and for storing the retrieved information in the objects in the memory of the computer.

10. The system of claim 9 wherein the retrieved information comprises response objects.

11. The system of claim 10 wherein the response objects are transmitted from the network-attached components.

12. The system of claim 1 wherein the application is a user interface application for displaying the hierarchy of the object-based representation of the network.

13. The system of claim 1 wherein the application comprises a programming application for producing a device-to-device interface for accessing the object-based representation of the network.

14. A method for operating and maintaining resources in a distributed network having a plurality of components, the method comprising:
   (a) providing an object-based representation of a network in a memory of a computer connected to the network, wherein the object-based representation comprises objects linked together in the memory to form a hierarchy, wherein each of the objects represent the network or network-attached components connected to the network and operating in an operation and maintenance (OAM) system, wherein the object-based representation includes a signaling protocol object that contains and groups together attributes of a signaling protocol used in the network, wherein each of the objects stores attribute information about the network or the network-attached-components with regard to the OAM system; and
   (b) operating the network based on the object-based representation of the network, wherein operating the network based on the object-based representation of the network includes using the objects in the object-based representation to provide OAM services to the network and the network-attached components, wherein the object-based representation comprises first and second objects, wherein the first object comprises first predefined attributes, wherein the second object inherits the first predefined attributes of the first object, and the second object comprises second predefined attributes different from the first predefined attributes.

15. The method of claim 14 wherein the object-based representation comprises a system object at an apex of the hierarchy, wherein the system object represents the network.

16. The method of claim 15 wherein the object-based representation includes a plurality of network-attached device objects describing and representing the network-attached components, the network-attached device objects being linked to the system object.

17. The method of claim 16 wherein the network-attached components comprise components selected from the group consisting of a gateway, a trunk, a port, and an endpoint.

18. The method of claim 13 wherein the signaling protocol object is linked to the system object.

19. The method of claim 18 wherein the signaling protocol object comprises a Q.2931 protocol object.

20. The method of claim 14 wherein each object is defined to comprise relationships with other objects and a set of attributes containing associated attribute information.

21. The method of claim 14 wherein the objects comprise predefined attributes about the network or network-attached component.

22. The method of claim 14 comprising retrieving information from the network components.

23. The method of claim 22 comprising storing the retrieved information in the objects in the memory of the computer.

24. The method of claim 23 wherein the retrieved information comprises response objects.

25. The method of claim 24 transmitting the response objects from the network-attached components.

26. The method of claim 14 comprising displaying the hierarchy of the object-based representation of the network.

27. The method of claim 14 comprising providing a programming application for producing a device-to-device interface for accessing the object-based representation of the network.

28. A computer program product comprising computer-executable instructions embodied in a computer-readable medium for performing steps comprising:
   (a) providing an object-based representation of a network in a memory of a computer connected to the network, wherein the object-based representation comprises objects linked together in the memory to form a hierarchy, wherein each of the objects represent the network or network-attached components connected to the network and operating in an operation and maintenance (OAM) system, wherein the object-based representation includes a signaling protocol object that contains and groups together attributes of a signaling protocol used in the network, wherein each of the objects stores attribute information about the network or the network-attached-components with regard to the OAM system; and
   (b) operating the network based on the object-based representation of the network, wherein operating the network based on the object-based representation of the network includes using the objects in the object based representation to provide OAM services to the network and the network-attached components, wherein the object-based representation comprises first and second objects, wherein the first object comprises first predefined attributes, wherein the second object inherits the first predefined attributes of the first object, and the second object comprises second predefined attributes different from the first predefined attributes.

29. The computer program product of claim 28 wherein the object-based representation comprises a system object at an apex of the hierarchy, wherein the system object represents the network.

30. The computer program product of claim 29 wherein the object-based representation includes a plurality of network-attached device objects describing and representing the network-attached components, the network-attached device objects being linked to the system object.

31. The computer program product of claim 30 wherein the network-attached components comprise components selected from the group consisting of a gateway, a trunk, a port, and an endpoint.

32. The computer program product of claim 29 wherein the signaling protocol object is linked to the system object.

33. The computer program product of claim 32 wherein the signaling protocol object comprises a Q.2931 protocol object.

34. The computer program product of claim 28 wherein each object is defined to comprise relationships with other objects and a set of attributes containing associated attribute information.

35. The computer program product of claim 28 wherein the objects comprise predefined attributes about the network or network-attached component.

36. The computer program product of claim 28 comprising retrieving information from the network components.

37. The computer program product of claim 36 comprising storing the retrieved information in the objects in the memory of the computer.

38. The computer program product of claim 37 wherein the retrieved information comprises response objects.

39. The computer program product of claim 38 transmitting the response objects from the network-attached components.

40. The computer program product of claim 28 comprising displaying the hierarchy of the object-based representation of the network.

41. The computer program product of claim 28 comprising providing a programming application for producing a device-to-device interface for accessing the object-based representation of the network.

* * * * *